(12) United States Patent
Nelson et al.

(10) Patent No.: US 7,396,278 B2
(45) Date of Patent: Jul. 8, 2008

(54) CLEANING SHOE SPREADERS

(75) Inventors: Jeffrey Arthur Nelson, Geneseo, IL (US); Jason Thomas Abbott, Orion, IL (US); Kenneth Ralph Clifton, Coal Valley, IL (US)

(73) Assignee: Deere & Company, Moline, IL (US)

( * ) Notice: Subject to any disclaimer, the term of this patent is extended or adjusted under 35 U.S.C. 154(b) by 113 days.

(21) Appl. No.: 10/765,228

(22) Filed: Jan. 27, 2004

(65) Prior Publication Data

US 2005/0164755 A1    Jul. 28, 2005

(51) Int. Cl.
*A01F 12/32*    (2006.01)

(52) U.S. Cl. ...................................... 460/101; 460/102
(58) Field of Classification Search .................. 460/79, 460/84, 85, 90–93, 901, 101, 102; 209/254
See application file for complete search history.

(56) References Cited

U.S. PATENT DOCUMENTS

| | | | | |
|---|---|---|---|---|
| 1,312,302 A | * | 8/1919 | Benjamin | 209/254 |
| 2,537,523 A | * | 1/1951 | Frost | 55/334 |
| 2,732,941 A | * | 1/1956 | Deiss | 209/261 |
| 3,092,116 A | * | 6/1963 | Stroburg et al. | 460/8 |
| 3,367,496 A | * | 2/1968 | Cockle et al. | 209/261 |
| 3,581,746 A | * | 6/1971 | Louks | 460/9 |
| 3,722,802 A | * | 3/1973 | Kreienbaum | 239/658 |
| 3,731,475 A | * | 5/1973 | Balthes | 56/27.5 |
| 3,800,803 A | * | 4/1974 | Rouse | 460/101 |
| 4,465,592 A | * | 8/1984 | Nagl | 209/236 |
| 4,480,643 A | * | 11/1984 | Alm | 460/120 |
| 4,548,214 A | * | 10/1985 | Sheehan et al. | 460/9 |
| 4,573,483 A | * | 3/1986 | Raineri | 460/8 |
| 4,875,889 A | | 10/1989 | Hagerer et al. | 460/1 |
| 4,968,285 A | | 11/1990 | Schuhmacher | 460/97 |
| 5,282,771 A | * | 2/1994 | Underwood | 460/8 |
| 5,338,257 A | * | 8/1994 | Underwood | 460/8 |
| 6,579,172 B2 | | 6/2003 | Lauer | 460/101 |
| 6,585,584 B2 | | 7/2003 | Buermann | 460/101 |

FOREIGN PATENT DOCUMENTS

DE    20 11 413 A1    9/1971
DE    28 51 777 A1    7/1980

* cited by examiner

*Primary Examiner*—Thomas B Will
*Assistant Examiner*—Alicia Torres

(57) ABSTRACT

The movable cleaning shoe frame is provided with internal sidewalls. The frame supports a sieve for receiving grain to be cleaned. The sieve is provided with longitudinally extending dividers that define a plurality of longitudinally extending grain flow channels. The sidewalls and the dividers are provided with cleaning shoe spreaders that extend into the longitudinally extending grain flow channels above the sieve. Movement of the cleaning shoe drives the spreaders to flap back and forth. This flapping action of the spreaders distributes the grain to be cleaned transversely across the sieve so that the cleaning assembly operates more efficiently.

12 Claims, 3 Drawing Sheets

CLEANING SHOE SPREADERS

FIELD OF THE INVENTION

The present invention is directed to a cleaning shoe spreader that extends into the longitudinal flow path of grain to be cleaned which flaps back and forth to transversely distribute grain to be cleaned across the cleaning shoe.

BACKGROUND OF THE INVENTION

Combines are large agricultural machines that harvest, thresh, separate and clean an agricultural crop. A harvesting assembly harvests an agricultural crop from a field and directs the harvested crop to a feeder house that conveys the harvested crop to a threshing assembly. The threshing assembly threshes the harvested crop removing the grain from the other crop material. The threshed crop material is directed to a separating assembly that expands the threshed crop mat to release trapped grain. The remaining large components of crop material other than grain are expelled from the combine. These large components may be reduced in size by a straw chopper.

Grain and chaff fall from the threshing and separating assemblies and are directed to a cleaning assembly. The cleaning assembly removes the chaff from the grain and blows it out the rear of the combine. The cleaned grain is collected from the floor of the cleaning assembly and is directed to a grain tank by an elevator.

The cleaning assembly comprises a cleaning fan and a cleaning shoe. The cleaning shoe comprises a movable frame holding a series of sieves. The topmost sieve is called a chaffer sieve. The main difference between the chaffer sieve and the secondary sieve located below the chaffer sieve is the size of the sieve openings. The chaffer sieve openings are larger than the secondary sieve. The grain to be cleaned is first deposited on the chaffer sieve. The grain falls through the chaffer sieve to the secondary sieve and from the secondary sieve to the floor of the cleaning assembly. An air blast from the cleaning fan is directed upwardly through the chaffer sieve and the secondary sieve to blow the lighter chaff out the rear of the combine. The frame moves in a reciprocating, shaking or cascading manner to drive the grain to be cleaned longitudinally rearward along the chaffer sieve and secondary sieve. It should be noted that cleaning assemblies may comprise more than one secondary sieve.

Cleaning shoes operate most efficiently when the combine is on level ground. When the combine is operated on side slopes, the grain to be cleaned accumulates on the down hill side of the cleaning shoe and the uphill side is not loaded. In extreme operations, the combine is provided with leveling mechanisms that level the combine during sidehill operations. This is not an economic solution in the vast majority of farming operations. One simple solution has been to provide longitudinally extending dividers on the sieves that limit the downhill migration of grain to be cleaned. This solution is not entirely effective and a variety of other mechanisms a have been proposed that either pneumatically or mechanically drive a portion of the grain to be cleaned to the uphill side of the cleaning shoe.

SUMMARY OF THE INVENTION

It is an object of the present invention to provide a cleaning shoe spreader that extends into the longitudinal flow path of grain to be cleaned which flaps back and forth by movement of the cleaning shoe to transversely distribute grain to be cleaned across the cleaning shoe.

A cleaning shoe is provided with a movable frame having sidewalls. The frame supports a chaffer sieve and a secondary sieve for receiving grain to be cleaned. In the illustrated embodiment, the chaffer sieve is provided with longitudinally extending dividers that define a plurality of longitudinally extending grain flow channels. The sidewalls and the dividers are provided with cleaning shoe spreaders that extend into the longitudinally extending grain flow channels above the chaffer sieve. Movement of the cleaning shoe drives the spreaders to flap back and forth. This flapping action of the spreaders distributes the grain to be cleaned transversely across the chaffer sieve so that the cleaning assembly operates more efficiently. If room allows, the spreaders can also by positioned to spread grain being cleaned across the secondary sieve.

In the illustrated embodiment the spreaders are flexible and resilient panels. The flexible and resilient panels have an inner edge and an outer edge. The inner edge is secured to a mounting channel located on the cleaning shoe sidewalls or the dividers by mounting bolts, rivets, or some other suitable mounting mechanism. The outer edge is provided with a weight to accentuate the flapping movement of the panel. The panel extends outwardly from the sidewall or the divider in a downstream direction and at rest forms an acute angle with the sidewall or divider of between 30 and 60 degrees. The mounting channel forming the same acute angle.

In another embodiment the spreader may comprise a rigid panel that is pivotally mounted to the sidewalls and dividers. The rigid panel is biased into the downstream acute angle position discussed above by springs. Again movement of the cleaning shoe drives the flapping motion of the rigid panel.

DETAILED DESCRIPTION

Figure 1:
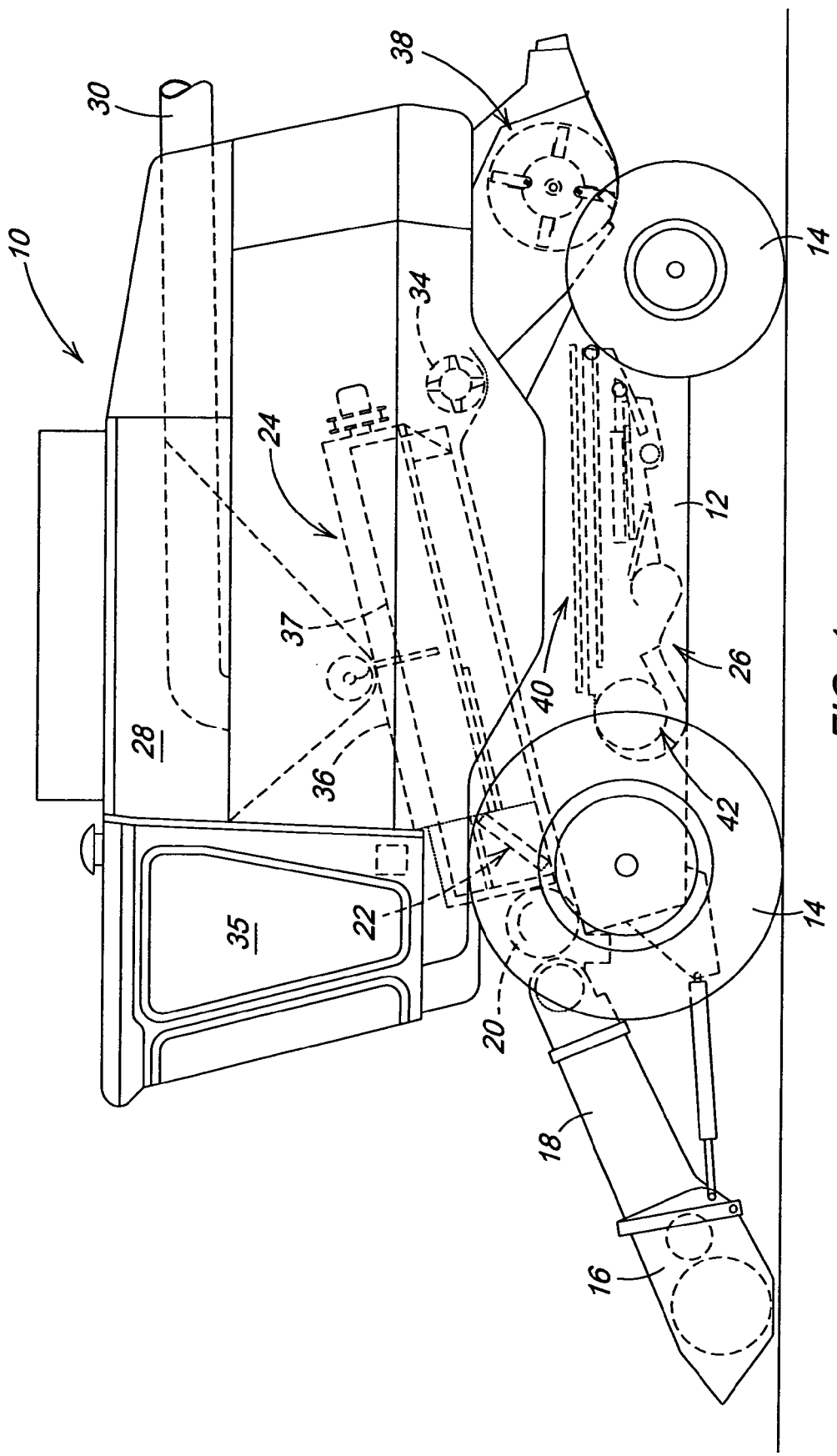
FIG. 1 is a semi-schematic side view of an agricultural combine.

FIG. 1 shows an agricultural harvesting machine in the form of a combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The harvested crop is directed by the feeder house 18 to an infeed beater 20. The infeed beater 20 directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater 34 in turn propels the harvested crop material other than grain to a straw chopper 38. The operation of the combine is controlled from operator's cab 35.

The axial crop processing unit comprises a housing 36 and a rotor 37 located inside the housing 36. The front part of the rotor 37 and the rotor housing 36 define the infeed section of the crop processing unit 24. Longitudinally downstream from the infeed section are threshing section, separating section and discharge section. The rotor 37 in the infeed section is provided with a conical rotor drum having helical infeed elements for engaging harvested crop material received from the infeed beater 20 and inlet transition section 22. Immediately downstream from the infeed section is the threshing section of the crop processing unit 24. In the threshing section the rotor 37 comprises a cylindrical rotor drum having a number of threshing elements for threshing the harvested crop material received from the infeed section. Downstream from the threshing section is the separating section wherein the grain trapped in the threshed crop material is released and falls through a floor grate to the cleaning system 26. The separating section merges into a discharge section where crop material other than grain is expelled from the axial crop processing unit 24 to the discharge beater 34. Although the invention is illustrated as being used on a rotary combine, the present invention can be used on other combine types including conventional straw walker combines and hybrid combines having transverse threshing cylinders and rotary separators.

Figure 2:
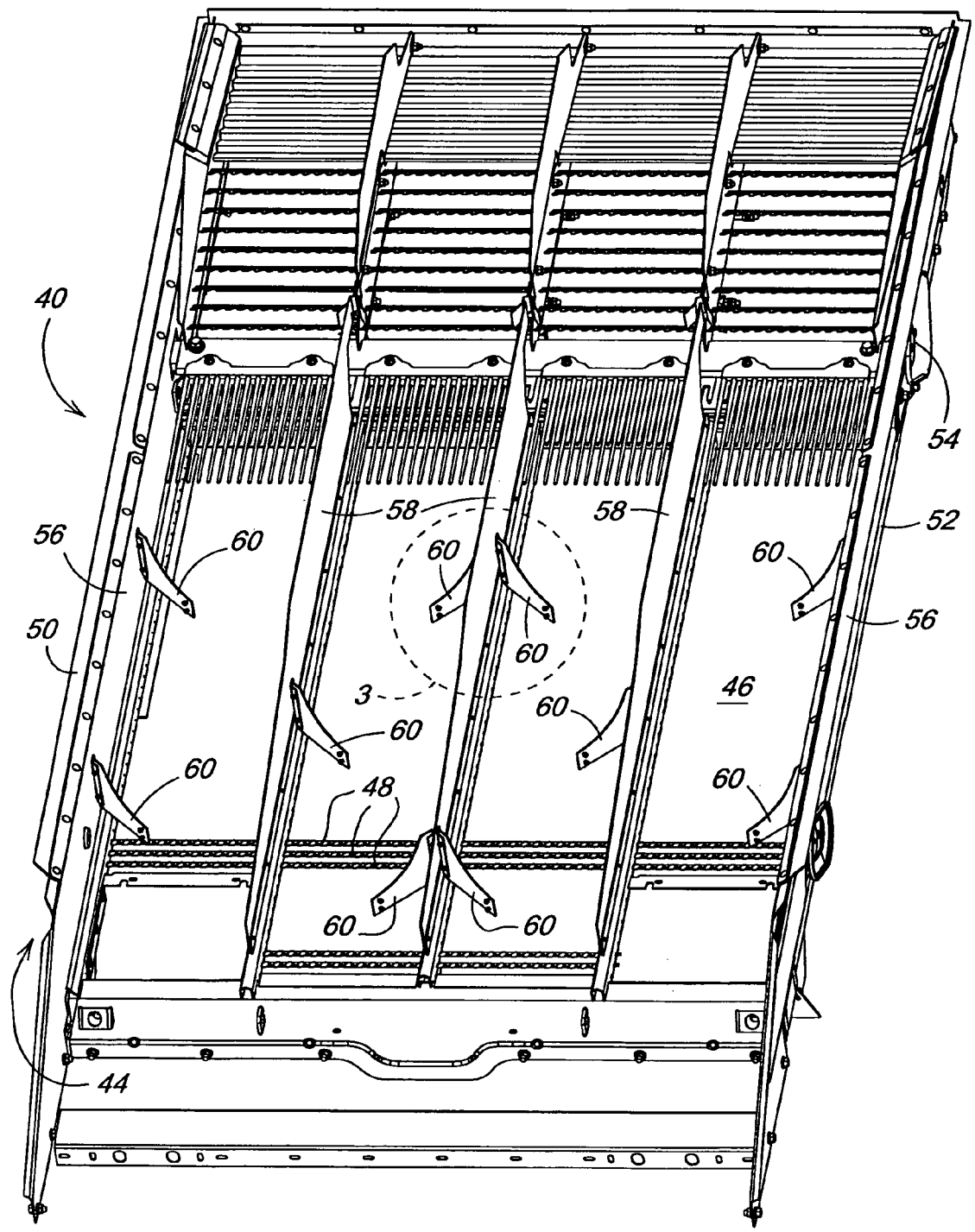
FIG. 2 is a perspective view of the cleaning shoe.
Figure 3:
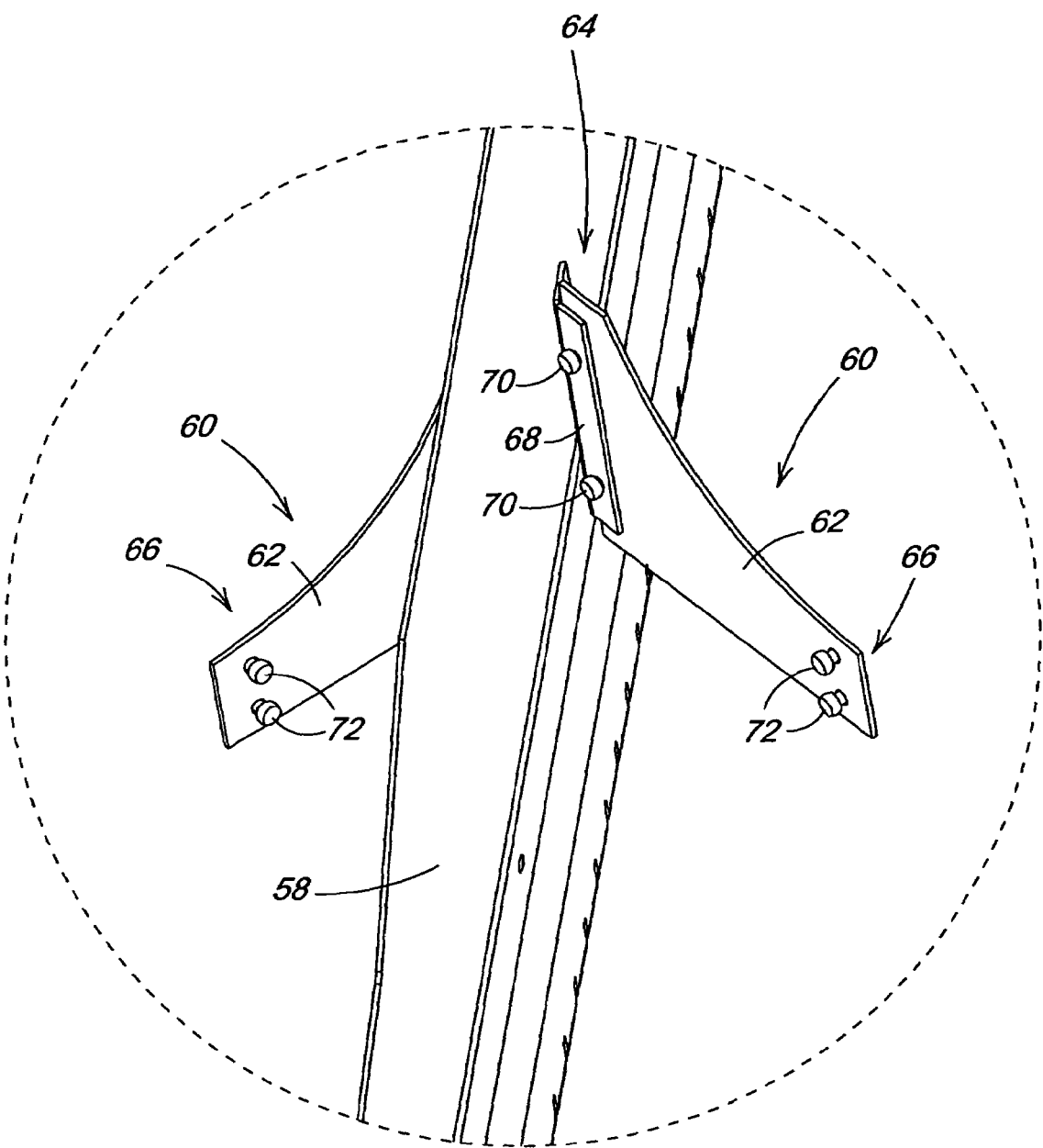
FIG. 3 is enlarged perspective view of the spreaders circled in FIG. 2.

The cleaning system 26 comprises a cleaning shoe 40 and a cleaning fan 42. The cleaning shoe 40 comprises a frame 44 holding a chaffer sieve 46 and a secondary sieve. The chaffer sieve 46 like the secondary sieve is provided with a series of transversely extending overlapping louvers 48 that extend the length of the chaffer sieve 46 and the secondary sieve. Only a small number of louvers 48 are illustrated in FIG. 2, with the remaining louvers being eliminated to better illustrate the present invention.

The illustrated cleaning shoe 40 is a reciprocating shoe wherein the chaffer sieve and the secondary sieve are reciprocated relative to one another. The frame 44 comprises an upper frame 50 and a lower frame 52 that are joined together by hangers 54. The chaffer sieve 46 is supported on the upper frame 50 and the secondary sieve is supported on the lower frame 52. Although the invention is illustrated as being used on a reciprocating cleaning shoe, the present invention can be used on other cleaning shoe types including shaker shoes and cascading shoes. In addition, the present invention can be used on the chaffer sieve or the secondary sieve.

The upper frame 50 of the cleaning shoe 40 is provided with two sidewalls 56 having interior surfaces facing the chaffer sieve 46. Three longitudinally extending dividers 58 are mounted to the chaffer sieve 46. Spreaders 60 are mounted to the sidewalls 56 and the dividers 58 and extend into the longitudinal flow path of grain being cleaned passing over the chaffer sieve 46. Each spreader 60 comprises a panel 62 extending into the flow path. Movement of the cleaning shoe 40 drives the panels 62 to flap back and forth. This flapping action of the panels distributes the grain to be cleaned transversely across the chaffer sieve so that the cleaning assembly operates more efficiently.

In the illustrated embodiment, the spreaders 60 are flexible and resilient panels. The flexible and resilient panels have an inner edge 64 and an outer edge 66. The inner edge 64 is secured to a mounting channel 68 located on the cleaning shoe sidewalls 56 and the dividers 58 by mounting bolts 70, rivets, or some other suitable mounting mechanism. The outer edge 66 is provided with weights 72 to accentuate the flapping movement of the panel 62. In the illustrated embodiment, the weights comprise mounting bolts bolted to the panel 62 although other weight designs could be used. The panels 62 extend outwardly from the sidewalls 56 and the dividers 58 in a downstream direction. At rest, the downstream extending panels 62 form an acute angle with the sidewalls 56 and the dividers 58 of between 30 and 60 degrees. The mounting channel 68 defining the same acute angle.

The flexible and resilient panel is formed from a rubber belting material called PVC 100 and marketed by Alert Manufacturing.

In another embodiment, the spreader 60 may comprise a rigid panel that is pivotally mounted to the sidewalls 56 and the dividers 58. The rigid panel is biased and maintained in the downstream acute angle position discussed above by springs. Again, movement of the cleaning shoe 40 drives the flapping motion of the rigid panel.

Having described the illustrated embodiment, it will become apparent that various modifications can be made without departing from the scope of the invention as defined in the accompanying claims.

The invention claimed is:

1. A cleaning shoe for an agricultural harvesting machine comprising:
    a movable frame having sidewalls;
    a sieve supported on the frame, the sieve defining a longitudinal flow path for grain being cleaned, the sieve having a plurality of longitudinally extending dividers located between and extending parallel to the sidewalls affixed to a top surface thereof; and
    spreaders mounted to and extending from the sidewalls and the plurality of longitudinally extending dividers into the longitudinal flow path, the spreaders comprising flexible and resilient panels having an attached weight at an outer edge thereof that resiliently flap back and forth due to movement of the frame.

2. The cleaning shoe blade as defined by claim 1 wherein the panels extend downstream at an acute angle to the sidewalls and the dividers.

3. The cleaning shoe as defined by claim 2 wherein the panels have an inner edge provided with a mounting assembly.

4. The cleaning shoe as defined by claim 1 wherein the panels comprise a flexible and resilient rubber belting material.

5. The cleaning shoe as defined by claim 2 wherein the acute angle is between 30 and 60 degrees.

6. A cleaning shoe for an agricultural harvesting machine comprising:
    a movable frame having sidewalls;
    a sieve supported on the frame, the sieve being provided with longitudinally extending dividers defining a longitudinal flow path for grain being cleaned; and
    spreaders mounted to and extending from the dividers and the sidewalls into the longitudinal flow path, the spreaders comprising flexible and resilient panels having a weight attached to an outer edge thereof that resiliently flap back and forth due to movement of the frame.

7. The cleaning shoe as defined by claim 6 wherein the panels extend downstream at an acute angle to the dividers.

8. The cleaning shoe as defined by claim 7 wherein the panels have an inner edge provided with a mounting assembly.

9. The cleaning shoe as defined by claim 7 wherein the acute angle is between 30 and 60 degrees.

10. The cleaning shoe as defined by claim 9 wherein the panels comprise a flexible and resilient rubber belting material.

11. The cleaning shoe as defined by claim 6 wherein the movable frame reciprocates.

12. The cleaning shoe as defined by claim 6 wherein the sieve is a chaffer sieve.

* * * * *